(12) United States Patent
Mukherjee et al.

(10) Patent No.: US 11,282,172 B2
(45) Date of Patent: Mar. 22, 2022

(54) GUIDED RESTORATION OF VIDEO DATA USING NEURAL NETWORKS

(71) Applicant: GOOGLE LLC, Mountain View, CA (US)

(72) Inventors: Debargha Mukherjee, Cupertino, CA (US); Urvang Joshi, Mountain View, CA (US); Yue Chen, Kirkland, WA (US); Sarah Parker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 151 days.

(21) Appl. No.: 16/515,226

(22) Filed: Jul. 18, 2019

(65) Prior Publication Data

US 2020/0184603 A1    Jun. 11, 2020

Related U.S. Application Data

(60) Provisional application No. 62/778,266, filed on Dec. 11, 2018.

(51) Int. Cl.
*G06T 9/00* (2006.01)
*G06T 5/00* (2006.01)
(Continued)

(52) U.S. Cl.
CPC ............ *G06T 5/001* (2013.01); *G06K 9/6256* (2013.01); *G06N 3/0454* (2013.01); *G06N 3/08* (2013.01);
(Continued)

(58) Field of Classification Search
CPC . G06T 2207/20084; G06T 2207/20081; G06T 9/002; G06T 5/001; G06T 5/50;
(Continued)

(56) References Cited

FOREIGN PATENT DOCUMENTS

WO    2017036370 A1    3/2017

OTHER PUBLICATIONS

Zhang et al., "Residual Highway Convolutional Neural Networks for in-loop Filtering in HEVC", IEEE Transactions on Image Processing, vol. 27, No. 8. (Year: 2018).*
(Continued)

*Primary Examiner* — Kenny A Cese
(74) *Attorney, Agent, or Firm* — Young Basile Hanlon & MacFarlane, P.C.

(57) ABSTRACT

Guided restoration is used to restore video data degraded from a video frame. The video frame is divided into restoration units (RUs) which each correspond to one or more blocks of the video frame. Restoration schemes are selected for each RU. The restoration schemes may indicate to use one of a plurality of neural networks trained for the guided restoration. Alternatively, the restoration schemes may indicate to use a neural network and a filter-based restoration tool. The video frame is then restored by processing each RU according to the respective selected restoration scheme. During encoding, the restored video frame is encoded to an output bitstream, and the use of the selected restoration schemes may be signaled within the output bitstream. During decoding, the restored video frame is output to an output video stream.

20 Claims, 9 Drawing Sheets

(51) Int. Cl.

| | |
|---|---|
| *G06T 5/50* | (2006.01) |
| *G06N 3/08* | (2006.01) |
| *G06N 3/04* | (2006.01) |
| *H04N 19/70* | (2014.01) |
| *H04N 19/176* | (2014.01) |
| *G06N 20/20* | (2019.01) |
| *G06T 3/40* | (2006.01) |
| *G06K 9/62* | (2022.01) |

(52) U.S. Cl.
CPC ............... *G06N 20/20* (2019.01); *G06T 3/40* (2013.01); *G06T 5/50* (2013.01); *G06T 9/002* (2013.01); *H04N 19/176* (2014.11); *H04N 19/70* (2014.11); *G06T 2207/20081* (2013.01); *G06T 2207/20084* (2013.01)

(58) Field of Classification Search
CPC ........ G06N 3/08; G06N 3/0454; H04N 19/70; H04N 19/176
See application file for complete search history.

(56) References Cited

OTHER PUBLICATIONS

Park et al., "CNN-Based in-Loop Filtering for Coding Efficiency Improvement", IEEE 12th Image, Video, and Multidimensional Signal Processing Workshop (IVMSP), IEEE. (Year: 2016).*
Zhang et al., "Residual Highway Convolutional Neural Networks for in-loop Filtering in HEVC", Aug. 2018, IEEE Transactions on Image Processing, vol. 27, No. 8. (Year: 2018).*
Park et al., "CNN-Based in-Loop Filtering For Coding Efficiency Improvement", IEEE 12th Image, Video, and Multidimensional Signal Processing Workshop, Department of Electrical Engineering, Korea Advanced Institute of Science and Technology. (Year: 2016).*
International Search Report and Written Opinion of International Application No. PCT/US2019/059019 dated Feb. 17, 2020.
Zhang et al; "Residual Highway Convolutional Neural Networks for In-Loop Filtering in HEVC" IEEE Transactions on Image Processing; IEEE Services Center; vol. 27, No. 8, Aug. 2018; pp. 3827-3841.
Wang et al; "AHG9: Dense Residual Convolution Neural Network Based In-Loop Filter"; JVET Meeting; Jul. 14, 2018; 3 Pages.
Park et al; CNN-Based in-loop filtering for coding efficency improvement; 2016 IEEE 12 Image, Video and Multidimentional signal processing workshop; Jul. 11, 2016; pp. 1-5.
Jia Chuanmin et al; "Content-Aware Convolutional Neural Network for In-Loop Filtering in High Efficiency Video Coding" IEEE Transactions on Image Processing; vol. 28, No. 7; Jul. 1, 2019; pp. 3343-3356.
Anonymous; "An Intuitive Explanation of Convolutional Neural Networks—The Data Science Blog"; May 29, 2017; p. 13.
Rivaz et al.; "AV1 Bitstream & Decoding Process Specification"; Jan. 2019; pp. 1-669.
Lu et al. "Deep Kalman Filtering Network for Video Compression Artifact Reduction"; ECCV 2018; 17 pages.
Yu et al.; "Deep Convolution Networks for Compression Artifacts Reduction"; Aug. 2016; pp. 1-13.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

\* cited by examiner

GUIDED RESTORATION OF VIDEO DATA USING NEURAL NETWORKS

BACKGROUND

This disclosure claims the benefit of U.S. Provisional Application No. 62/778,266, filed Dec. 11, 2018, the disclosure of which is herein incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for guided restoration of video data degraded from a video frame of a video sequence according to an implementation of this disclosure comprises dividing the video frame into a first restoration unit and a second restoration unit. The first restoration unit corresponds to one or more first blocks of the video frame and the second restoration unit corresponds to one or more second blocks of the video frame. A first portion of the degraded video data is located within the first restoration unit and a second portion of the degraded video data is located within the second restoration unit. The method further comprises selecting a first restoration scheme for the first restoration unit and selecting a second restoration scheme for the second restoration unit. The first restoration scheme indicates to use a first neural network to restore the first portion of the degraded video data, and the second restoration scheme indicates to use a second neural network to restore the second portion of the degraded video data. The method further comprises restoring the video frame by processing the first restoration unit according to the first restoration scheme and by processing the second restoration unit according to the second restoration scheme. The method further comprises encoding another video frame of the video sequence to an output bitstream using the restored video frame.

An apparatus for guided restoration of video data degraded from a video frame of a video sequence according to an implementation of this disclosure comprises a memory and a processor. The memory stores instructions and data associated with neural networks available for restoring some or all of the degraded video data. The processor is configured to execute the instructions stored in the memory. The instructions include instructions to determine that a first restoration unit corresponding to one or more first blocks of the video frame includes a first portion of the degraded video data. The instructions further include instructions to determine that a second restoration unit corresponding to one or more second blocks of the video frame includes a second portion of the degraded video data. The instructions further include instructions to restore the video frame by processing the first restoration unit using a first neural network of the neural networks and by processing the second restoration unit using a second neural network of the neural networks. The instructions further include instructions to encode another video frame of the video sequence to an output bitstream using the restored video frame. The instructions further include instructions to signal the use of the first neural network and the second neural network within the output bitstream using one or more syntax elements.

An encoder for guided restoration of video data degraded from a video frame according to an implementation of this disclosure comprises a dequantization stage, an inverse transform stage, a reconstruction stage, a loop filtering stage, and a guided restoration stage. The dequantization stage that dequantizes quantized transform coefficients associated with one or more blocks of the video frame to produce transform coefficients. The inverse transform stage that inverse transforms the transform coefficients to produce a prediction residual. The reconstruction stage that reconstructs the prediction residual to produce a reconstructed frame. The filtering stage that filters the reconstructed frame to produce a filtered reconstructed frame. The guided restoration stage that divides the filtered reconstructed frame into restoration units and uses restoration schemes selected based on portions of the degraded video data included within respective ones of the restoration units to restore the video frame.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
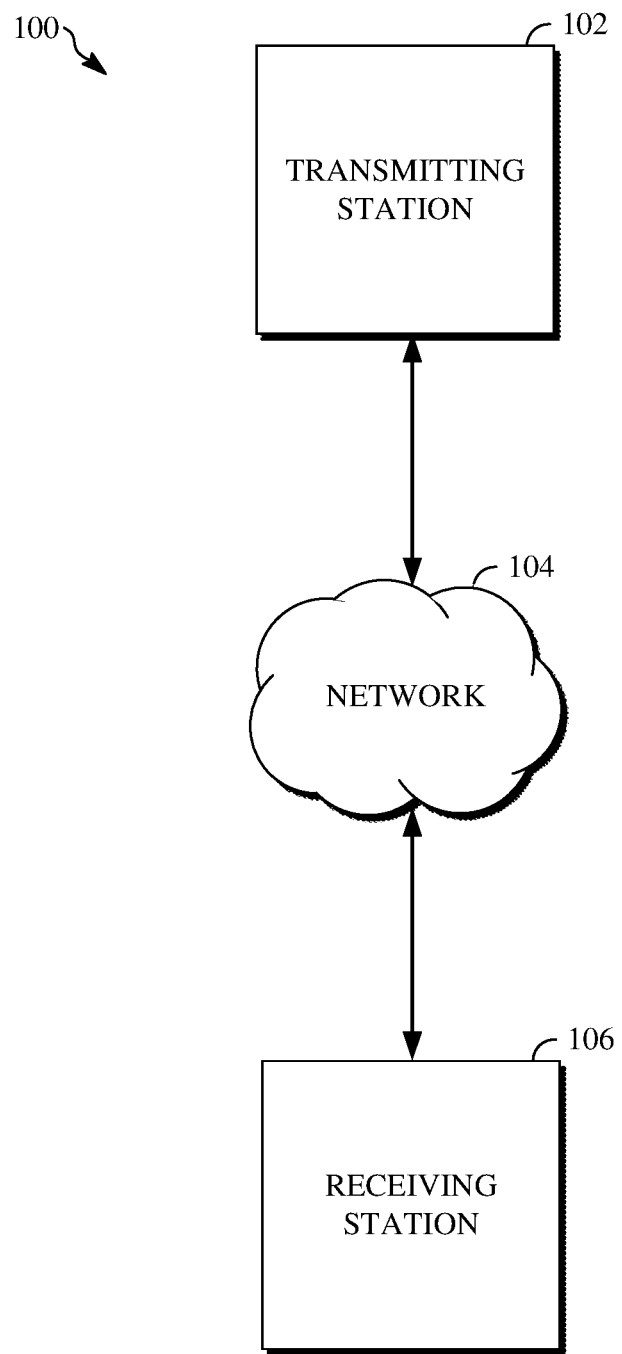
FIG. 1 is a schematic of an example of a video encoding and decoding system.

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information. Video compression techniques performed by typical encoders include degrading an input video stream to reduce the data size when encoded to a compressed bitstream. For example, lossy operations performed during the prediction, transform, and/or quantization stages of an encoder may remove certain video data from the input video stream, while preserving other video data which is later used by a decoder to reconstruct the compressed bitstream into an output video stream.

The encoder and decoder may also perform operations for restoring the degraded video data, such as after filtering has occurred (e.g., within the reconstruction loop at the encoder or prior the outputting at the decoder). For example, loop restoration may be performed to process a reconstructed video frame for use as a reference frame. The reference frame may then be used for predicting subsequent video frames of the input video stream. Performing loop restoration includes dividing a video frame into a number of restoration units (RUs). For example, in AV1, a RU may be a square-shaped segment of the video frame of size 64×64, 128×128, or 256×256.

For each RU, the encoder or decoder selects a restoration scheme to use for restoring the video data degraded from that RU. The restoration scheme then is applied to the RU to restore the degraded video data. In some cases, a restoration scheme may indicate to use a filter to restore degraded video data. For example, the filter can be a Wiener filter (e.g., a separable symmetric normalized Wiener filter), a dual self-guided filter, or another filter. For example, an encoder or a decoder may selectively use such a filter to restore video data for a RU. In another example, a neural network (e.g., a convolutional neural network (CNN) or other machine learning approach may be trained to select restoration schemes to use to restore degraded video data for individual RUs.

For example, a CNN may be trained to restore high resolution information of a video frame based on low resolution video data. An encoder or a decoder may perform inference operations against RUs using a trained CNN to select a restoration scheme to use for each RU, such as based on the content of each individual RU. One conceptual approach to loop restoration is thus to train a single CNN to identify degradations for various video data types and quality levels, and to learn restoration schemes that are effective for restoring those various degradations. However, the use of a single CNN to restore all types of video data degradation at different quality levels is computationally inefficient. Furthermore, in practice, it may be infeasible to train a single CNN to accurately process all types of video data degradation at all quality levels.

Implementations of this disclosure address problems such as these using guided restoration of video data using neural networks. The guided restoration is used to restore video data degraded from a video frame. The video frame is divided into restoration units (RUs) which each correspond to one or more blocks of the video frame. Restoration schemes are selected for each RU. The restoration schemes may indicate to use one of a plurality of neural networks trained for the guided restoration. Alternatively, the restoration schemes may indicate to use a neural network and a filter-based restoration tool. The video frame is then restored by processing each RU according to the respective selected restoration scheme. During encoding, the restored video frame is encoded to an output bitstream, and the use of the selected restoration schemes is signaled within the output bitstream. During decoding, the restored video frame is output to an output video stream.

Training the neural networks for use in the guided restoration includes first classifying data samples of a training data set into some number of data subsets. Each data sample includes a degraded block and a corresponding original block. For example, the classifying can be based on image features, such as edge direction and/or edge strength. In another example, the classifying can be based on intuitive observation, such as indicated within configurations defined for the encoder, decoder, or other computing component used to train the neural networks. Each of the data subsets is then processed using each of the neural networks, such as to reconstruct video data using those data subsets. The resulting reconstructed video data is then measured and a neural network used to produce the closest reconstruction for each of the data subsets is identified. The data subsets are then reclassified according to the respective identified neural networks. The reconstruction and reclassification may iterate until the reconstructions for the data subsets meet a threshold measurement. The neural networks are thus trained according the results of the iterative reclassification.

Further details of techniques for guided restoration of video data using neural networks are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
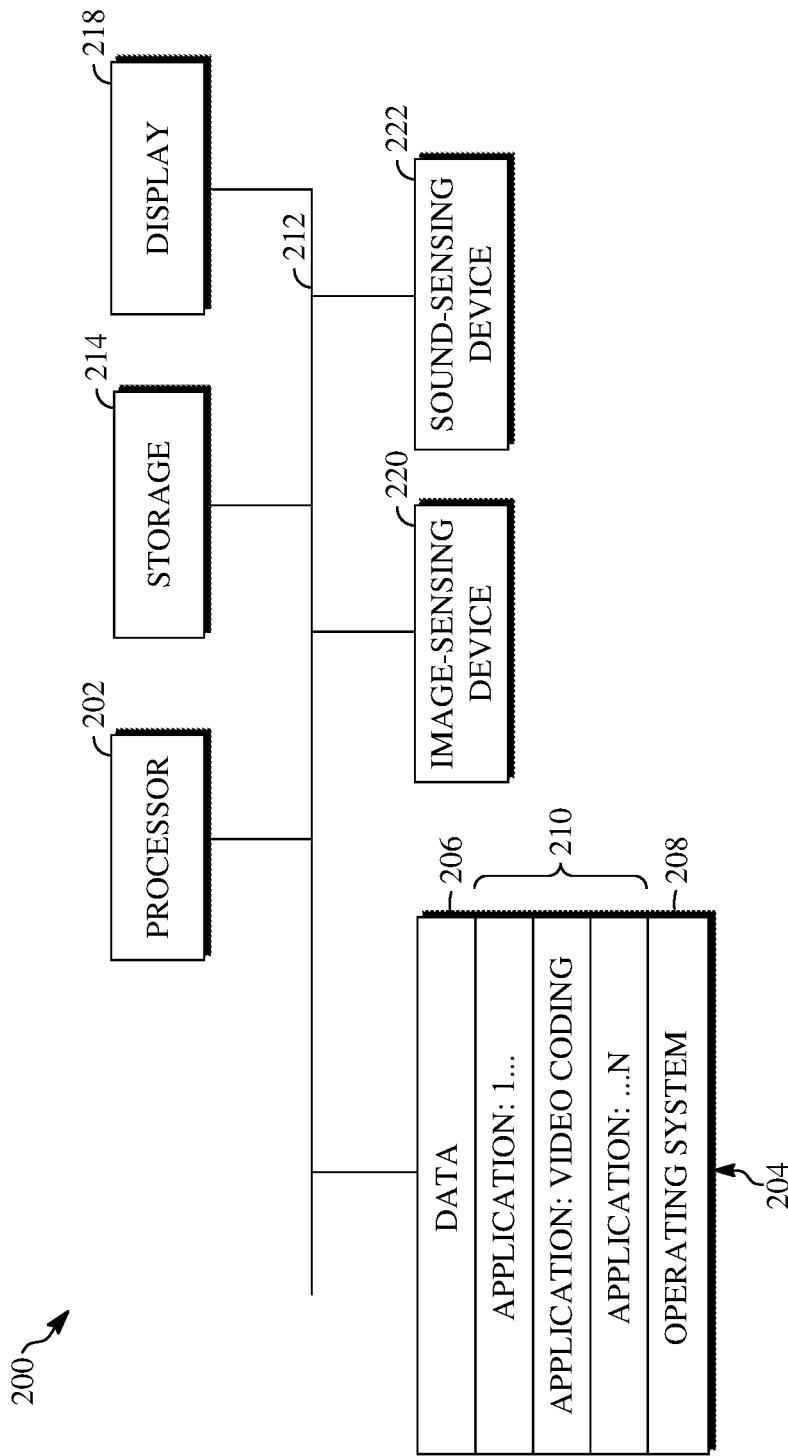
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video and/or image coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
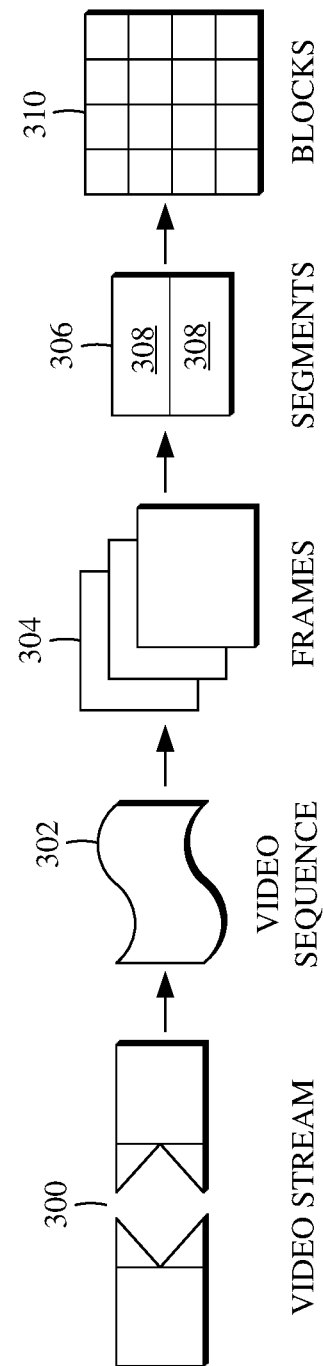
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
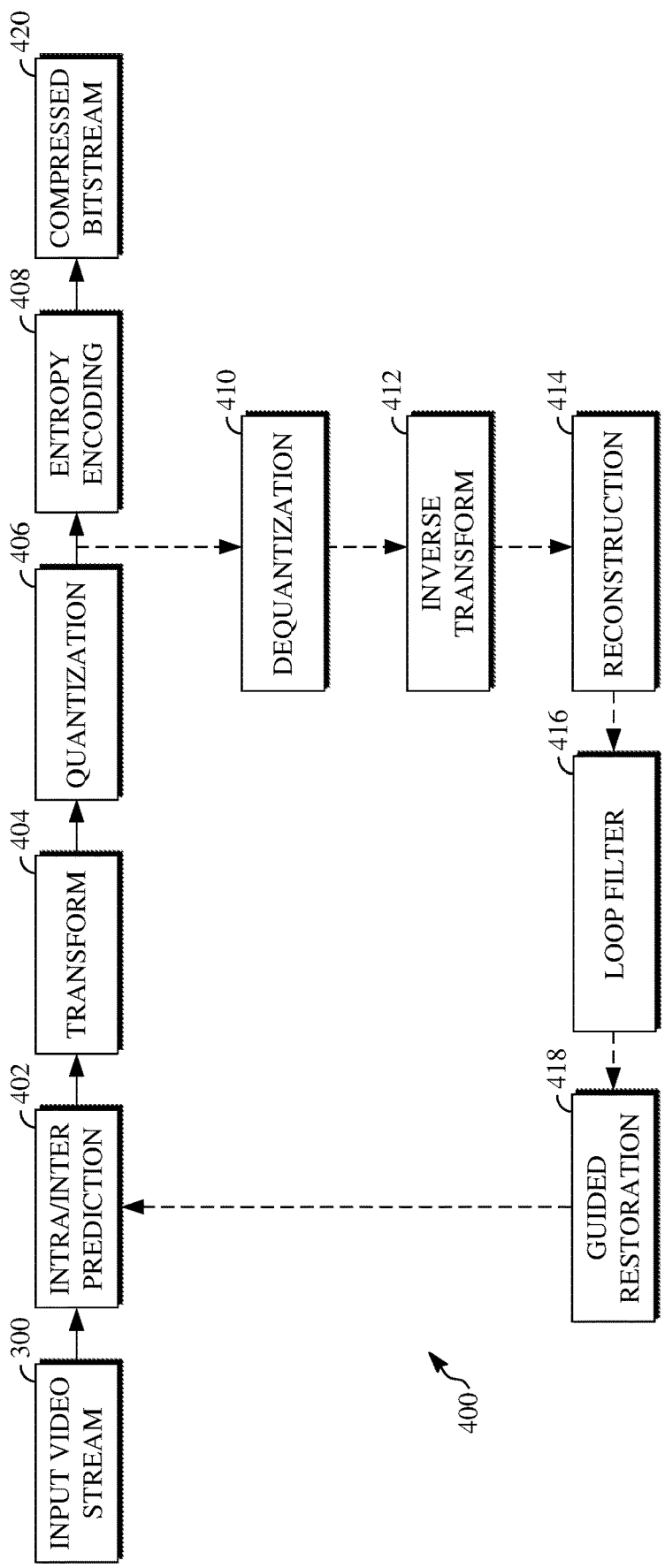
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, a loop filtering stage 416, and a guided restoration stage 418. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same information to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual or a prediction residual).

At the reconstruction stage 414, the prediction block that was predicted at the intra/inter prediction stage 402 can be added to the derivative residual block to create a reconstructed block. Multiple reconstructed blocks from a same source frame can be reconstructed to produce a reconstructed frame. The loop filtering stage 416 can apply an in-loop filter and/or another filter to a reconstructed frame to reduce distortion such as blocking artifacts. Examples of filters include, without limitation: a deblocking filter as in H.264, HEVC, VP9, and AV1; a Constrained Directional Enhancement Filter as in AV1; and a loop restoration filter as in AV1. The loop filtering stage 416 can include using one or more such filters.

At the guided restoration stage 418, the filtered reconstructed frame is divided into restoration units and processed using one or more restoration schemes. For example, a restoration scheme used at the guided restoration stage 418 can include processing a restoration unit using a trained neural network, such as to restore video data degraded from the portion of the reconstructed frame corresponding to that restoration unit. Implementations and examples of guided restoration, such as which may be performed at the guided restoration stage 418, are described below with respect to FIGS. 6 and 8.

Other variations of the encoder 400 can be used to encode the compressed bitstream 420. In some implementations, the encoder 400 can quantize the residual signal directly without the transform stage 404 for certain blocks or frames. In some implementations, the encoder 400 can have the quantization stage 406 and the dequantization stage 410 combined in a common stage. In some implementations, the loop filtering stage 416 may be omitted. For example, the guided restoration stage 418 may occur immediately following the reconstruction stage 414. In such an implementation, the guided restoration stage 418 performs the guide restoration against the output of the reconstruction stage 414.

In some implementations, the encoder 400 may include a learning stage (not shown), such as for training a neural network for the guided restoration of video data. For example, the learning stage may be included within the guided restoration stage 418. In another example, the learning stage may be a separate stage. Implementations and examples of training a neural network for the guided restoration of video data, such as which may be performed at the learning stage, are described below with respect to FIGS. 7 and 9.

Figure 5:
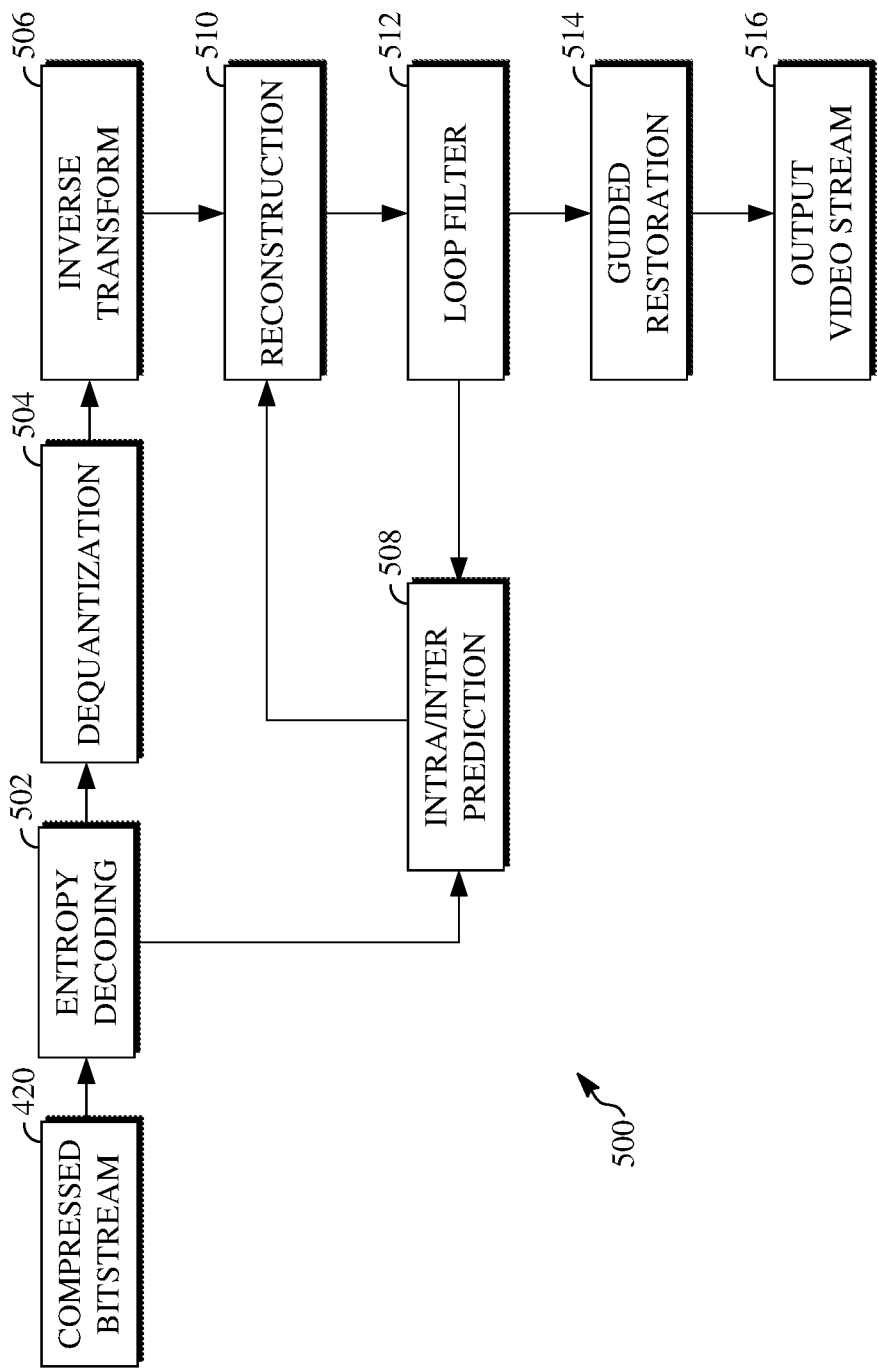
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a guided restoration 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 416 can apply an in-loop filter and/or another filter to a reconstructed frame to reduce distortion such as blocking artifacts. Examples of filters include, without limitation: a deblocking filter as in H.264, HEVC, VP9, and AV1; a Constrained Directional Enhancement Filter as in AV1; and a loop restoration filter as in AV1. The loop filtering stage 416 can include using one or more such filters.

At the guided restoration stage 514, the reconstructed frame is divided into restoration units and processed using one or more restoration schemes. For example, a restoration scheme used at the guided restoration stage 514 can include processing a restoration unit using a trained neural network, such as to restore video data degraded from the portion of the reconstructed frame corresponding to that restoration unit. Implementations and examples of guided restoration, such as which may be performed at the guided restoration stage 514, are described below with respect to FIGS. 6 and 8. The result of the guided restoration stage 514 is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can include a post filter stage. For example, the post filter stage can include applying one or more filters to the reconstructed blocks within a reconstructed frame, such as to reduce blocking distortion within the reconstructed frame. In some implementations, the loop filtering stage 512 may be omitted. For example, the guided restoration stage 514 may occur immediately following the reconstruction stage 510. In such an implementation, the guided restoration stage 514 performs the guided restoration against the output of the reconstruction stage 510.

In some implementations, the decoder 500 may include a learning stage (not shown), such as for training a neural network for the guided restoration of video data. For example, the learning stage may be included within the guided restoration stage 514. In another example, the learning stage may be a separate stage. Implementations and examples of training a neural network for the guided restoration of video data, such as which may be performed at the learning stage, are described below with respect to FIGS. 7 and 9.

Figure 6:
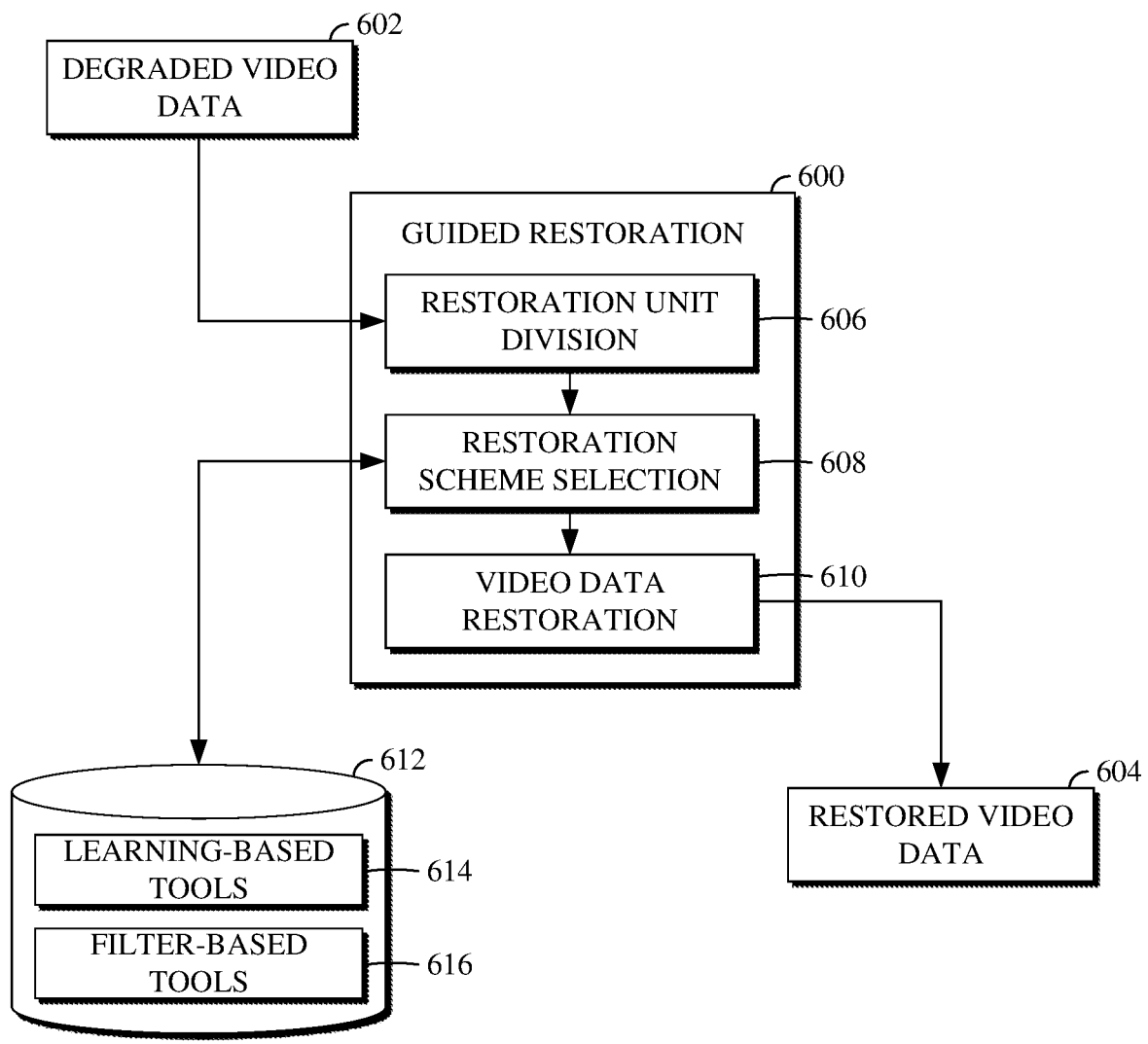
FIG. 6 is a block diagram of an example of a guided restoration stage of an encoder or a decoder.

FIG. 6 is a block diagram of an example of a guided restoration stage 600 of an encoder or a decoder. For example, the guided restoration stage 600 may be the guided restoration stage 418 shown in FIG. 4, the guided restoration stage 514 shown in FIG. 5, or another guided restoration stage as may be performed using a video encoder or a video decoder.

The guided restoration stage 600 receives degraded video data 602 and processes it to produce restored video data 604. For example, the degraded video data 602 may be a reconstructed video frame produced before or after filtering operations are performed. In another example, the degraded video data 602 may be video data associated with another video frame. The restored video data 604 may, for example, be a reference frame output for storage in a reference frame buffer or an output video frame to be included in an output video stream.

The guided restoration stage 600 includes a RU division stage 606, a restoration scheme selection stage 608, and a video data restoration stage 610. At the RU division stage 606, the video frame associated with the degraded video data 602 (e.g., the reconstructed video frame or other video frame) is divided into a number of RUs. The RUs are of size M×N, where M and N may be the same or different numbers. As such, the RUs may be square or rectangular in shape. The RUs may all be of the same size and shape. Alternatively, the RUs may be variably sized and/or variably shaped. For example, a variable size and/or variable shape RU partitioning scheme can be used to divide the video frame into the number of RUs.

The size of the RUs may be based on the size of the largest block within the video frame. For example, if the largest block within the video frame is 128×128, the RUs produced or otherwise identified by the RU division stage 606 may be of size 128×128 or larger. That is, in that the goal of guided restoration is to restore the video frame to as close to its original form as possible, the RU division stage 606 divides the video frame into RUs with the goal of those RUs being similar in size and shape to the blocks of the video frame.

The restoration scheme selection stage 608 selects a restoration scheme for each of the RUs produced or otherwise identified by the RU division stage 606. In particular, for a given RU, the restoration scheme selection stage 608 selects a restoration scheme to use to restore the portion of the degraded video data 602 which is located within that RU. The restoration scheme for a given RU is selected based on the video data located within that RU. As such, the restoration scheme selection stage 608 may select the same or different restoration schemes for each of the RUs.

The encoder or decoder using the guided restoration stage 600 may include or otherwise have access to a tool store 612, which may be a database, data store, or other repository. The tool store 612 stores information associated with one or more learning-based tools 614 and information associated with one or more filter-based tools 616. The learning-based tools 614 include a plurality of neural networks (e.g., CNNs) which have been trained for guided restoration of video data. For example, the learning-based tools 614 may represent the result of the implementations and examples of neural network training described below with respect to FIG. 7. Each of the learning-based tools 614 thus corresponds to a neural network which has been trained to restore certain degraded video data.

The filter-based tools 616 include one or more filtering techniques usable to restore degraded video data. For example, the filter-based tools 616 may include one or more of a Wiener filter (e.g., a separable symmetric normalized Wiener filter), a dual self-guided filter, or another filter. For example, the Wiener filter may be an M×N filter (where M and N may be the same or different numbers) for which parameters for each horizontal and vertical filter are signaled (e.g., within a bitstream). In another example, the dual self-guided filter may be an M×N filter (where M and N may be the same or different numbers) for which noise parameters are signaled and in which the output of one or more such filters are weighted.

A restoration scheme selected by the restoration scheme selection stage 608 can include one or more of the learning-based tools 614 and/or one or more of the filter-based tool 616s. The restoration scheme selection stage 608 selects a restoration scheme for each individual RU based on the video data located within each individual RU. For example, the restoration scheme for a RU can be selected based on a quantization parameter used to produce the video data located within the RU (e.g., at a quantization stage of an encoder). In another example, the restoration scheme for a RU can be selected based on a number of non-zero quantized transform coefficients located within the RU (e.g., as opposed to those taken from one or more reference frames).

In yet another example, the restoration scheme for a RU can be selected based on similarities between the video data located within the RU and video data for which components of the restoration scheme are defined. For example, the restoration scheme selection stage 608 can determine whether one or more of the learning-based tools 614 and/or one of more of the filter-based tools 616 have been defined for use with the video data located within a given RU or with video data similar thereto. A difference threshold can be used to measure the similarities. In yet another example, the restoration scheme for a RU may indicate to not perform restoration.

The video data restoration stage 610 restores the video frame associated with the degraded video data 602 by processing each of the RUs according to the respective restoration schemes. Where the restoration scheme selected for a RU indicates to use a neural network for the restoration (e.g., because the restoration scheme includes one or more of the learning-based tools 614), processing the RU according to that restoration scheme includes performing inference against the RU using the neural network. Where the restoration scheme selected for a RU indicates to use a filter for the restoration (e.g., because the restoration scheme includes one or more of the filter-based tools 616), processing the RU according to that restoration scheme includes filtering the video data located within the RU according to that filter.

The restored video data 604, as mentioned above, may be or include a restored video frame (e.g., the video frame associated with the degraded video data 602 after the restoration performed at the video data restoration stage 610). For example, during encoding, the restored video frame may be encoded to an output bitstream after the guided restoration stage 600 has completed. In another example, during decoding, the restored video frame may be output to an output video stream after the guided restoration stage 600 has completed.

The restored video data 604 may also be or include data used to signal the restoration schemes selected at the restoration scheme selection stage 608. For example, during encoding, the restored video data 604 may be included within the output bitstream to signal the restoration scheme that was used for each of the RUs, and, therefore, for the blocks of the video frame corresponding to those individual RUs. The signaling may be performed at the guided restoration stage 600 (e.g., at the video data restoration stage 610 or a different stage, such as a stage not shown in FIG. 6) or during a portion of the encoding pipeline occurring after the guided restoration stage 600.

In some cases, the restored video data 604 used to signal the selected restoration schemes (or the portion thereof, to the extent different) may be or include syntax elements relating to other aspects of the encoding process. For example, the restoration scheme selected for a given RU can be signaled based on the quantization parameter used to produce the video data located within that RU. For example, the restoration scheme selected for a given RU can be signaled based on the number of non-zero quantized transform coefficients located within that RU. The quantization parameter and/or number of non-zero quantized transform coefficients are indicated using one or more syntax elements within the output bitstream. Thus, the selected restoration schemes may be signaled using those syntax elements.

Other variations of the guided restoration stage 600 can be used to produce the restored video data 604. In some implementations, the size of the RUs produced or otherwise identified by the RU division stage 606 may not be based on the size of the largest block within the video frame. For example, the size of the RUs may be based on a configuration of the encoder or decoder that includes the guided restoration stage 600. In another example, the size of the RUs may be based on a non-block partition of the video frame. In yet another example, the size of the RUs may be less than the size of the largest block within the video frame. In some implementations, the RUs can have different sizes and/or shapes from one another.

In some implementations, some or all of the selected restoration schemes may not be signaled. For example, selecting the restoration scheme for a RU based on a quantization parameter or based on a number of non-zero quantized transform coefficients may include identifying a restoration scheme associated with such quantization parameter or with such number of non-zero quantized transform coefficients. For example, the encoder and the decoder may each be trained to correspond certain restoration schemes to certain quantization parameters or ranges of quantization parameters. In another example, the encoder and the decoder may each be trained to correspond certain restoration schemes to certain numbers of non-zero quantized transform coefficients or ranges of non-zero quantized transform coefficients. In such an implementation, the selected restoration scheme may not be signaled, such as within the output bitstream.

Figure 7:
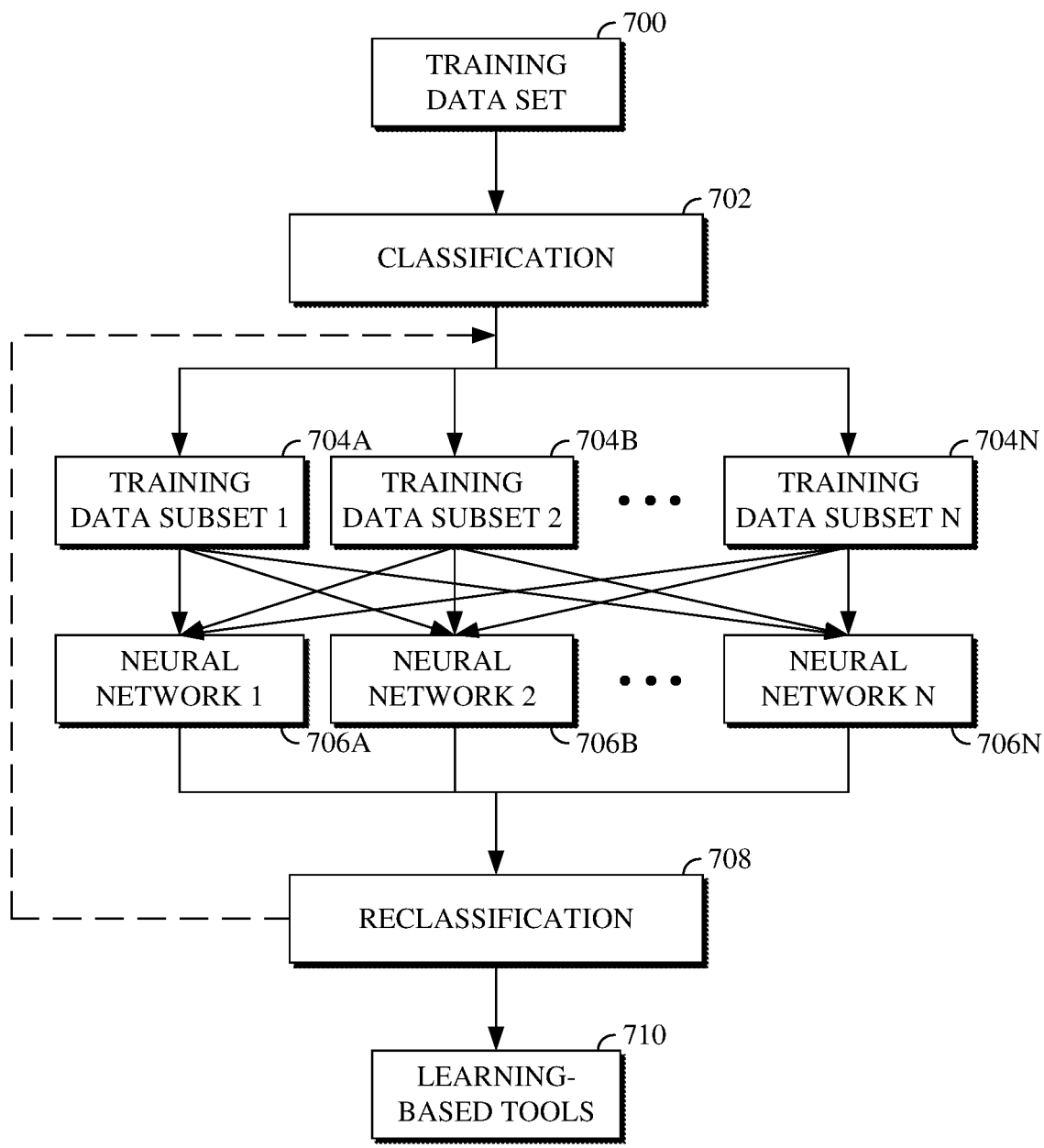
FIG. 7 is a block diagram of an example of a learning stage of an encoder or a decoder.

FIG. 7 is a block diagram of an example of a learning stage of an encoder or a decoder. For example, the learning stage may be a learning stage of the encoder 400 shown in FIG. 4. In another example, the learning stage may be a learning stage of the decoder 500 shown in FIG. 5. The learning stage is used to train neural networks for guided restoration of video data, such as for use with a guided restoration stage of an encoder or a decoder (e.g., the guided restoration stage 600 shown in FIG. 6).

A training data set 700 is received and processed at a classification stage 702 to produce a number of training data subsets 704A, 704B, 704N. The training data set 700 includes a number of data samples representing video data. Each data sample includes a degraded block of a video frame and a corresponding original block. The degraded block may, for example, refer to a block of the video frame after the coefficients within that block have been quantized. The original block may, for example, refer to the same block as received from an input video stream or other source, such as prior to prediction. In some cases, the degraded block may refer to a RU and the corresponding original block may refer to one or more blocks corresponding to that RU.

The classification stage 702 processes the data samples of the training data set 700 by classifying those data samples according to one or more classification criteria. In particular, classifying the training data set includes partitioning the data samples into the training data subsets 704A, 704B, 704N based on the classification criteria. The number N may, for example, be a parameter defined by a configuration at the encoder, decoder, or other computing component used to implement the classification stage 702. The classification criteria may refer to image features (e.g., edge direction and/or edge strength) and/or intuitive observation.

Each of the training data subsets 704A, 704B, 704N is then processed using each of a plurality of neural networks 706A, 706B, 706N. Processing a given one of the training data subsets using a given one of the neural networks includes using the neural network to produce a reconstruction of the video data represented by the training data subset. As such, each of the neural networks 706A, 706B, 706N produces a reconstruction for each of the training data subsets.

A reclassification stage 708 receives those reconstructions. The reclassification stage 708 compares those reconstructions against the original video data to identify which of the reconstructions is the closest reconstruction for each of the training data subsets 704A, 704B, 704N. The reclassification stage 708 then reclassifies the data samples within each of the training data subsets 704A, 704B, 704N based on those closest reconstructions. Reclassifying the data samples for a given training data subset includes identifying which of the neural networks 706A, 706B, 706N was used to produce the closest reconstruction for that training data subset. Those data samples are then placed within a bucket associated with that neural network.

After each of the training data samples is reclassified, the neural networks 706A, 706B, 706N each processes the data samples within each of the buckets to produce new reconstructions of the data samples. The new reconstructions may then be iterated through again, such as by placing them within the same or different buckets for a further processing using the neural networks 706A, 706B, 706N. Each processing of the data samples in the arrangements presented represents a training operation for the neural networks 706A, 706B, 706N, such that the neural networks 706A, 706B, 706N are trained by the processing and iterating.

When the iterations have been completed, or if a decision is made to not iterate, the neural networks 706A, 706B, 706N are output as learning-based tools 710. The learning-based tools 710 may then be used for guided restoration of video data. For example, the learning-based tools 710 may be the learning-based tools 614 described above with respect to FIG. 6.

Figure 8:
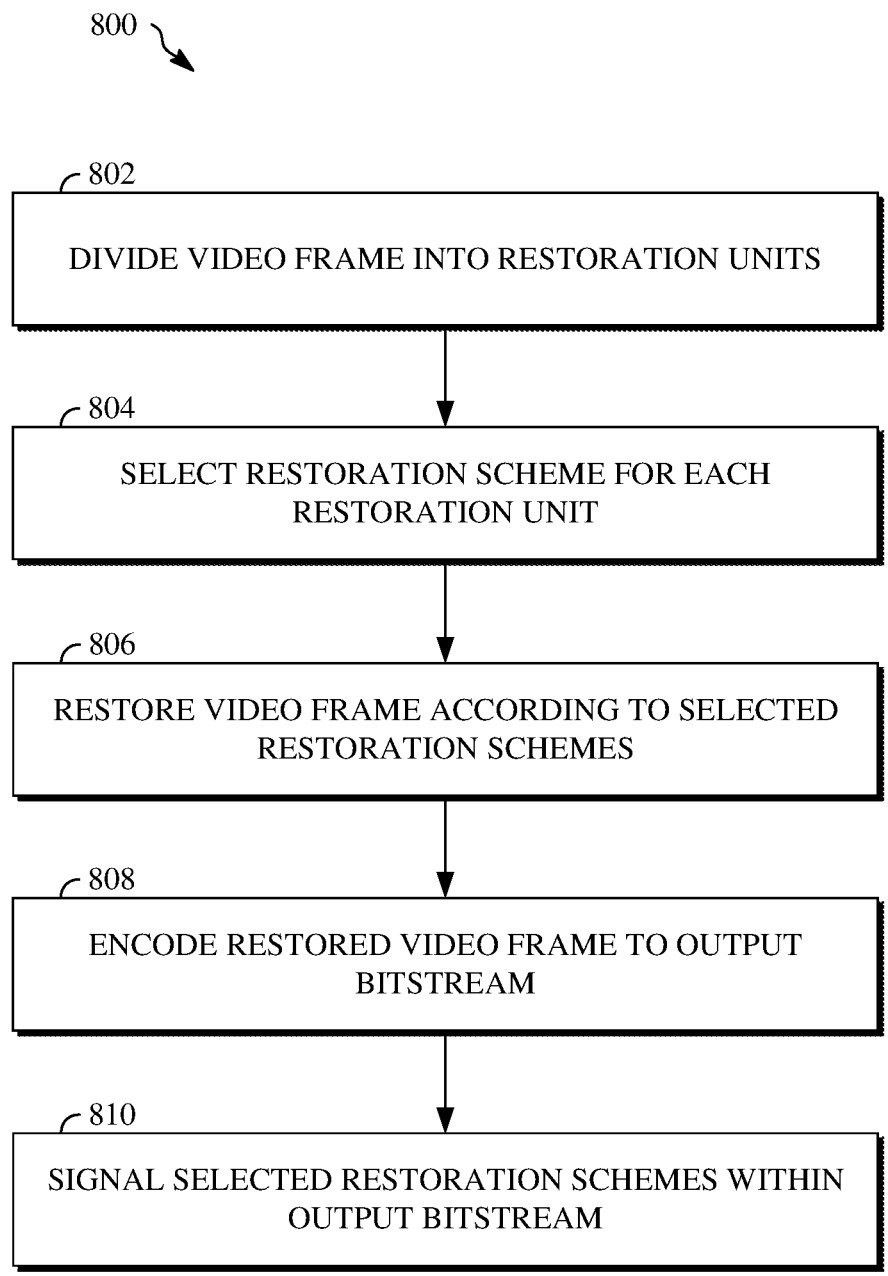
FIG. 8 is a flowchart diagram of an example of a technique for guided restoration of video data using neural networks.
Figure 9:
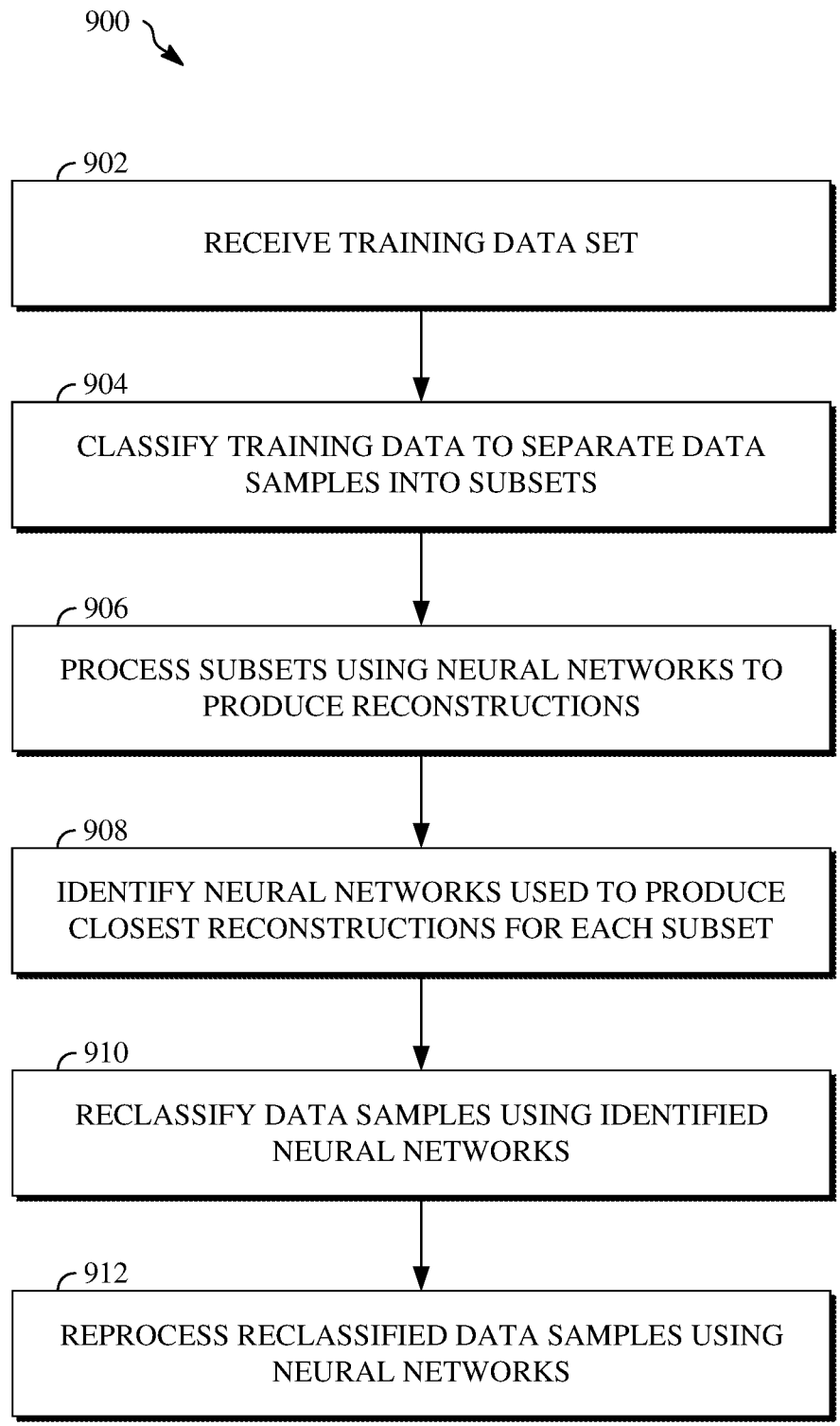
FIG. 9 is a flowchart diagram of an example of a technique for training neural networks for guided restoration of video data.

Further details of techniques for guided restoration of video data using neural networks are now described. FIG. 8 is a flowchart diagram of an example of a technique 800 for guided restoration of video data using neural networks. FIG. 9 is a flowchart diagram of an example of a technique 900 for training neural networks for guided restoration of video data.

The technique 800 and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 800 and/or the technique 900. The technique 800 and/or the technique 900 can be implemented using specialized hardware or firmware. For example, a hardware component configured to perform the technique 800 and/or the technique 900. As explained above, some computing devices may have multiple memories or processors, and the operations described in the technique 800 and/or the technique 900 can be distributed using multiple processors, memories, or both.

For simplicity of explanation, the techniques 800 and 900 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for guided restoration of video data using neural networks is shown. At 802, a video frame is divided into a number of RUs. For example, the video frame can be divided into RUs including a first RU and a second RU, in which the first RU corresponds to one or more first blocks of the video frame and the second RU corresponds to one or more second blocks of the video frame. As such, a first portion of degraded video data to be restored and which is associated with the video frame is located within the first RU and a second portion of the degraded video data is located within the second RU.

At 804, a restoration scheme is selected for each RU. For example, a first restoration scheme can be selected for the first RU and a second restoration scheme can be selected for the second RU. The first restoration scheme can indicate to use a first neural network to restore the first portion of the degraded video data. The second restoration scheme can indicate to use a second neural network to restore the second portion of the degraded video data. The first and second neural networks may be the same neural network or different neural networks.

The first and second neural networks are respectively selected for the first RU and the second RU based on the video data associated with the first RU and with the second RU. For example, selecting a restoration scheme for the first or second RU can include determining a quantization parameter used to quantize the coefficients located within that RU. A number of neural networks trained for the guided restoration of video data may be trained to process certain types of video data based on the quantization parameters used to produce those video data.

For example, each of the neural networks trained for guided restoration may be trained to restore data within a given range of quantization parameter values. In some cases, multiple neural networks may be trained for each given range. For example, where 16 neural networks are trained to restore video data where the quantization parameter is between X and Y, one of those 16 neural networks may be selected for use as the restoration scheme. For example, the selected neural network may be defined for use with the specific quantization parameter used for the given RU, or the selected neural network may be selected based on another characteristic of the video data located within the RU (e.g., a number of non-zero quantized transform coefficients located therein).

A bit value may later be encoded to the bitstream to signal which of the neural networks was selected. For example, where there are 16 neural networks to select from for a given quantization parameter range, the bit value may be four bits. In another example, where there are 8 neural networks to select from a given quantization parameter range, the bit value may be three bits.

In another example, selecting the restoration scheme for the first or second RU can include determining a number of non-zero quantized transform coefficients located within that RU. For example, certain restoration schemes can be selected for the RUs based on whether the number of non-zero quantized transform coefficients located within a given RU meets a threshold or based on a simple count of the non-zero quantized transform coefficients located within that RU. The number of non-zero quantized transform coefficients located with a given RU may thus indicate the extent of the restoration that is needed. For example, if a block of the video frame has no motion and is simply copied from one or more reference frames, there is no restoration needed for that block.

At 806, the video frame is restored according to the restoration schemes selected for the individual RUs. Restoring the video frame includes processing each of the RUs according to the restoration scheme selected for them. For example, processing the first RU using the first restoration scheme includes performing inference against the video data located within the first RU using the first neural network, and processing the second RU using the second restoration scheme includes performing inference against the video data located within the second RU using the second neural network.

At 808, the restored video frame is encoded to an output bitstream. At 810, the restoration schemes selected for the individual RUs are signaled within the output bitstream. The selected restoration schemes can be signaled using one or more syntax elements within the bitstream. The syntax elements can be used to signal the restoration scheme selected for each of the RUs. For example, the syntax elements can be encoded to a frame header of the restored video frame. The syntax elements can directly indicate a selected restoration scheme, such as based on an identifier of the restoration scheme. Alternatively, the syntax elements can indirectly indicate a selected restoration scheme, such as where those syntax elements are used to signal other information (e.g., a quantization parameter, a number of non-zero quantized transform coefficients, etc.) which is associated with a particular restoration scheme.

In some implementations, the technique 800 can include storing the restored frame within a reference frame buffer for use in predicting motion of another video frame. In some implementations, one or both of the first restoration scheme or the second restoration scheme can indicate to use a filter-based restoration tool for restoring the respective video data. For example, the filter-based restoration tool can be used in addition to or instead of a neural network.

In some implementations, the selected restoration schemes may be signaled separately from the output bitstream. For example, the selected restoration schemes may be signaled within a separate file, such as a CSV, JSON, text, or other file type. The separate file may be transmitted simultaneously with the output bitstream, such as from the encoder to the decoder or to a storage at which the output bitstream and the separate file are stored before decoding using the decoder. Alternatively, the separate file can be transmitted at a different time.

In some implementations, the operations for signaling some or all of the selected restoration schemes may be omitted. For example, the encoder and the decoder may each be trained to correspond certain restoration schemes to certain quantization parameters or ranges of quantization parameters and/or to certain numbers of non-zero quantized transform coefficients or ranges of non-zero quantized transform coefficients. As such, the decoder that receives and decodes the output bitstream may not rely upon indexes or other indicators signaled within the bitstream to determine which restoration scheme to select for a RU.

Although the technique 800 is described above with respect to an encoding process, the technique 800 may also or instead be performed during a decoding process. For example, when the technique 800 is performed for decoding, the technique 800 can include receiving an encoded video frame from a bitstream, decoding the encoded video frame to produce a reconstructed video frame, dividing the reconstructed video frame into a number of RUs, selecting the restoration scheme according to data signaled within the bitstream, restoring the reconstructed video frame according to the restoration schemes, and outputting the restored video frame to an output video stream.

Referring next to FIG. 9, the technique 900 for training neural networks for guided restoration of video data is shown. The technique 900 describes operations which may be performed as part of the encoding or decoding of video data. For example, the technique 900 may be performed using an encoder, such as the encoder 400 shown in FIG. 4, and/or using a decoder, such as the decoder 500 shown in FIG. 5.

At 902, a training data set is received. The training data set includes a number of data samples representing video data. Each data sample includes a degraded block of a video frame and a corresponding original block. The degraded block may, for example, refer to a block of the video frame after the coefficients within that block have been quantized. The original block may, for example, refer to the same block as received from an input video stream or other source, such as prior to prediction. In some cases, the degraded block may refer to a RU and the corresponding original block may refer to one or more blocks corresponding to that RU. The data samples of the training data set may be received from previously encoded or decoded video frames, from a video data repository, as a batch designed to train neural networks for guided restoration of video data, or from another source.

At 904, the training data set is classified to separate the data samples of the training data set into training data subsets. Classifying the training data set includes partitioning the data samples into the number of training data subsets based on one or more classification criteria. The one or more classification criteria may, for example, refer to a direction and/or a strength of one or more edges within the video frame. Alternatively, the one or more classification criteria may refer to intuitive observations of video data, which can be configured into an encoder, a decoder, or another computing component used to perform the technique 900. As a further alternative, the classification criteria may refer to a quality of the data samples, such as may be indicated by a quantization parameter used to quantize the data samples.

At 906, the training data subsets are processed using neural networks to produce reconstructions of the video data associated with the data samples. Processing a given one of the training data subsets using a given one of the neural networks includes using the neural network to produce a reconstruction of the video data represented by the training data subset. For example, a neural network can receive the data samples of a training data subset and perform inference against it to produce the reconstruction for the training data subset.

At 908, the neural networks used to produce the closes reconstructions for each of the data sets is identified. The reconstructions produced by each of the neural networks for each of the training data subsets can be compared to original video data to measure the closeness of those reconstructions. For example, measurement the closeness of a reconstruction can include determining a difference between the reconstruction and the original video data on a pixel-by-pixel basis, comparing the difference to a threshold, or the like.

At 910, the data samples of the training data subsets are reclassified using the identified neural networks. Reclassifying the data samples of the training data subsets includes placing each training data subset within a bucket associated with the neural network used to produce its closest reconstruction. For example, some or all of the training data subsets may be placed with the same neural network or each of the training data subsets may be placed with a different neural network. In another example, some of the neural networks may not have a training data subset placed with it.

At 912, the reclassified data samples are reprocessed using the neural networks. Reprocessing the reclassified data samples using the neural networks includes using the neural networks to perform another inference operation against the reclassified data samples. For example, each of the neural networks may perform inference operations against each of the reclassified data samples. In another example, the neural networks can perform inference operations limited to the data samples placed within the buckets associated with them.

The reclassification and reprocessing operations can be repeated and iterated to further train the neural networks. In some implementations, the reclassification and reprocessing operations can be repeated and iterated until each of the closest reconstructions for the data samples meets a quality threshold, such as representing a maximum allowable difference between those closest reconstructions and the corresponding original video data. In some implementations, the reclassification and reprocessing operations can be repeated and iterated a defined number of times, such as based on configurations made to the encoder, decoder, or other computing component used to perform the technique 900.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for guided restoration of video data degraded from a video frame of a video sequence, the method comprising:
dividing the video frame into a first restoration unit and a second restoration unit, the first restoration unit corresponding to one or more first blocks of the video frame, the second restoration unit corresponding to one or more second blocks of the video frame, wherein a first portion of the degraded video data is located within the first restoration unit and a second portion of the degraded video data is located within the second restoration unit;
selecting a first restoration scheme for the first restoration unit, the first restoration scheme indicating to use a first neural network to restore the first portion of the degraded video data;
selecting a second restoration scheme for the second restoration unit, the second restoration scheme indicating to use a second neural network to restore the second portion of the degraded video data;
restoring the video frame by processing the first restoration unit according to the first restoration scheme and by processing the second restoration unit according to the second restoration scheme; and
encoding another video frame of the video sequence to an output bitstream using the restored video frame.

2. The method of claim 1, wherein the first portion of the degraded video data is of a first quality level and the second portion of the degraded video data is of a second quality level,
wherein the first neural network is trained to select restoration schemes based on the first quality level and the second neural network is trained to select restoration schemes based on the second quality level.

3. The method of claim 1, further comprising:
signaling that the first restoration scheme was used for the one or more first blocks and that the second restoration scheme was used for the one or more second blocks.

4. The method of claim 3, wherein signaling that the first restoration scheme was used for the one or more first blocks and that the second restoration scheme was used for the one or more second blocks comprises:
signaling the first restoration scheme and the second restoration scheme within the output bitstream using one or more syntax elements.

5. The method of claim 4, wherein the one or more syntax elements correspond to quantization parameters used to produce the degraded video data,
wherein the first restoration scheme and the second restoration scheme are signaled within the output bitstream based on the quantization parameters.

6. The method of claim 4, wherein the one or more syntax elements correspond to numbers of non-zero quantized transform coefficients included within the one or more first blocks and within the one or more second blocks,
wherein the first restoration scheme and the second restoration scheme are signaled within the output bitstream based on the numbers of non-zero quantized transform coefficients.

7. The method of claim 1, further comprising:
training the first neural network and the second neural network using a training data set including a number of data samples, wherein each of the data samples includes a degraded block and a corresponding original block.

8. The method of claim 7, wherein training the first neural network and the second neural network using the training data set including the number of data samples comprises:
classifying the training data set to separate the data samples into a number of training data subsets;
processing each of the training data subsets using each of a plurality of neural networks to produce reconstructions of the video data, the plurality of neural networks including the first neural network and the second neural network;
identifying, for each of the training data subsets, a neural network of the plurality of neural networks used to produce a closest reconstruction of the video data; and
reclassifying the training data into the training data subsets based on the neural network identified for each of the training data subsets, wherein the plurality of neural networks is trained based on the processing and the reclassifying.

9. The method of claim 8, wherein classifying the training data set to separate the data samples into the number of training data subsets comprises:
partitioning the data samples into the number of training data subsets based on one or more classification criteria.

10. The method of claim 9, wherein the one or more classification criteria include one or both of edge directionality or edge strength.

11. The method of claim 1, further comprising:
encoding the restored video frame to the output bitstream.

12. The method of claim 1, wherein one or both of the first restoration scheme or the second restoration scheme indicates to use a filter-based restoration tool.

13. An apparatus for guided restoration of video data degraded from a video frame of a video sequence, the apparatus comprising:
a memory storing instructions and data associated with neural networks available for restoring some or all of the degraded video data; and
a processor configured to execute the instructions stored in the memory to:
determine that a first restoration unit corresponding to one or more first blocks of the video frame includes a first portion of the degraded video data;
determine that a second restoration unit corresponding to one or more second blocks of the video frame includes a second portion of the degraded video data;
restore the video frame by processing the first restoration unit using a first neural network of the neural networks and by processing the second restoration unit using a second neural network of the neural networks;
encode another video frame of the video sequence to an output bitstream using the restored video frame; and
signal the use of the first neural network and the second neural network within the output bitstream using one or more syntax elements.

14. The apparatus of claim 13, wherein the instructions include instructions to:
select a first restoration scheme for the first restoration unit based on a quality level of the first portion of the degraded video data, the first restoration scheme indicating to the use the first neural network to restore the first portion of the degraded video data; and select a second restoration scheme for the second restoration unit based on a quality level of the second portion of the degraded video data, the second restoration scheme indicating to the use the second neural network to restore the second portion of the degraded video data.

15. The apparatus of claim 13, wherein the one or more syntax elements correspond to quantization parameters used to produce the degraded video data,
wherein the use of the first neural network and the second neural network is signaled within the output bitstream based on the quantization parameters.

16. The apparatus of claim 13, wherein the one or more syntax elements correspond to numbers of non-zero quantized transform coefficients included within the one or more first blocks and within the one or more second blocks,
wherein the use of the first neural network and the second neural network is signaled within the output bitstream based on the numbers of non-zero quantized transform coefficients.

17. The apparatus of claim 13, wherein the instructions include instructions to train the first neural network and the second neural network using a training data set including a number of data samples, each of the data samples including a degraded block and a corresponding original block, by:
classifying the training data set to separate the data samples into a number of training data subsets;
processing each of the training data subsets using each of a plurality of neural networks to produce reconstructions of the video data, the plurality of neural networks including the first neural network and the second neural network;
identifying, for each of the training data subsets, a neural network of the plurality of neural networks used to produce a closest reconstruction of the video data; and
reclassifying the training data into the training data subsets based on the neural network identified for each of the training data subsets, wherein the plurality of neural networks is trained based on the processing and the reclassifying.

18. A method for guided restoration of video data degraded from a video frame of a video sequence, the method comprising:
selecting a first restoration scheme indicating to use a first neural network to restore a first portion of the degraded video data based on a quality level of the first portion of the degraded video data;
selecting a second restoration scheme indicating to use a second neural network to restore a second portion of the degraded video data based on a quality level of the second portion of the degraded video data;
restoring the video frame by processing the first portion of the degraded video data according to the first restoration scheme and by processing the second portion of the degraded video data according to the second restoration scheme; and
encoding another video frame of the video sequence to an output bitstream using the restored video frame.

19. The method of claim 18, further comprising:
signaling the first restoration scheme and the second restoration scheme within the output bitstream using one or more syntax elements.

20. The method of claim 18, wherein one or both of the first restoration scheme or the second restoration scheme indicates to use a filter-based restoration tool.

* * * * *